United States Patent
Oh et al.

(10) Patent No.: US 10,562,367 B2
(45) Date of Patent: Feb. 18, 2020

(54) HEATING, VENTILATION, AND AIR CONDITIONING SYSTEM FOR VEHICLE

(71) Applicants: HYUNDAI MOTOR COMPANY, Seoul (KR); KIA MOTORS CORPORATION, Seoul (KR)

(72) Inventors: Man Ju Oh, Yongin-si (KR); Sang Shin Lee, Suwon-si (KR); Jae Woo Park, Ansan-si (KR); So Yoon Park, Suwon-si (KR); Jae Woong Kim, Hwaseong-si (KR); So La Chung, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 36 days.

(21) Appl. No.: 15/811,097

(22) Filed: Nov. 13, 2017

(65) Prior Publication Data
US 2019/0009635 A1    Jan. 10, 2019

(30) Foreign Application Priority Data
Jul. 7, 2017    (KR) .................. 10-2017-0086414

(51) Int. Cl.
*B60H 1/00*    (2006.01)
*B60H 1/22*    (2006.01)
(Continued)

(52) U.S. Cl.
CPC ..... *B60H 1/00278* (2013.01); *B60H 1/00392* (2013.01); *B60H 1/00885* (2013.01);
(Continued)

(58) Field of Classification Search
CPC .................................................. B60H 1/00278
See application file for complete search history.

(56) References Cited

U.S. PATENT DOCUMENTS 5,549,153 A * 8/1996 Baruschke ......... B60H 1/00278
165/42
6,357,541 B1 * 3/2002 Matsuda .................. B60K 6/22
180/68.2
(Continued)

FOREIGN PATENT DOCUMENTS

| JP | 5297154 B2 | 9/2013 |
|---|---|---|
| KR | 10-1448656 B1 | 10/2014 |
| KR | 10-2016-0055702 A | 5/2016 |

*Primary Examiner* — Jeffrey J Restifo
(74) *Attorney, Agent, or Firm* — Morgan, Lewis & Bockius LLP (57) ABSTRACT

A vehicular HVAC system, includes: a battery circulation line including a battery radiator, a high-voltage battery, and a first valve, arranged to allow a first coolant to circulate therethrough; a branch line selectively connected to the circulation line through the valve and having a cooling heat exchanger configured to exchange heat with an indoor air conditioning refrigerant line; a battery heating line including a water heater, an indoor air conditioning heater core, and a second valve, arranged to allow a second coolant to circulate therethrough, the battery heating line being selectively connected to the circulation line through the second valve; and a controller configured to control the first valve in stages, to cool the high-voltage battery, to control the second valve and the water heater to selectively heat the battery, and to control the water heater or a cooling device on the refrigerant line to air condition the vehicle.

18 Claims, 10 Drawing Sheets

(51) Int. Cl.
  *B60H 1/14* (2006.01)
  *B60H 1/32* (2006.01)
(52) U.S. Cl.
  CPC ........... *B60H 1/143* (2013.01); *B60H 1/2215* (2013.01); *B60H 1/2221* (2013.01); *B60H 1/323* (2013.01); *B60H 1/32281* (2019.05); *B60H 2001/00307* (2013.01)

(56) References Cited

U.S. PATENT DOCUMENTS

| | | | | |
|---|---|---|---|---|
| 6,651,761 | B1* | 11/2003 | Hrovat | H01M 8/04014 |
| | | | | 429/442 |
| 7,147,071 | B2* | 12/2006 | Gering | B60H 1/00278 |
| | | | | 237/12.3 B |
| 7,975,757 | B2* | 7/2011 | Nemesh | B60H 1/00278 |
| | | | | 165/42 |
| 8,997,503 | B2* | 4/2015 | Morisita | B60H 1/00921 |
| | | | | 62/79 |
| 9,212,599 | B2* | 12/2015 | Gao | B60L 58/27 |
| 9,261,093 | B2* | 2/2016 | Skelton | B60L 58/26 |
| 9,533,547 | B2* | 1/2017 | Cheng | B60K 11/04 |
| 9,561,704 | B2* | 2/2017 | Enomoto | B60H 1/00485 |
| 9,694,646 | B2* | 7/2017 | Takeuchi | F25B 5/00 |
| 9,701,215 | B1* | 7/2017 | Kim | B60L 11/1874 |
| 9,738,133 | B2* | 8/2017 | Inoue | B60H 1/22 |
| 9,758,010 | B2* | 9/2017 | Johnston | B60H 1/00385 |
| 9,780,422 | B2* | 10/2017 | Dunn | B60H 1/00278 |
| 9,878,594 | B2* | 1/2018 | Enomoto | B60L 1/003 |
| 9,950,638 | B2* | 4/2018 | Porras | B60H 1/00278 |
| 10,076,944 | B2* | 9/2018 | Jalilevand | B60H 1/00278 |
| 10,118,458 | B2* | 11/2018 | Kim | B60H 1/00921 |
| 10,166,835 | B2* | 1/2019 | Kim | B60H 1/00278 |
| 10,173,491 | B2* | 1/2019 | Kim | B60H 1/00007 |
| 10,183,544 | B2* | 1/2019 | Kim | B60H 1/00385 |
| 10,220,722 | B2* | 3/2019 | Lewis | B60H 1/03 |
| 10,252,597 | B2* | 4/2019 | Wallace | B60H 1/00342 |
| 10,252,599 | B2* | 4/2019 | Kim | B60H 1/00392 |
| 10,259,286 | B2* | 4/2019 | Janier | B60K 11/02 |
| 2002/0043413 | A1* | 4/2002 | Kimishima | B60H 1/323 |
| | | | | 180/68.1 |
| 2009/0280395 | A1* | 11/2009 | Nemesh | B60H 1/00278 |
| | | | | 429/62 |
| 2009/0317697 | A1* | 12/2009 | Dogariu | B60H 1/00278 |
| | | | | 429/62 |
| 2011/0139397 | A1 | 6/2011 | Haussmann | |
| 2011/0296855 | A1* | 12/2011 | Johnston | B60L 3/0046 |
| | | | | 62/79 |
| 2012/0234518 | A1* | 9/2012 | Brodie | B60H 1/00278 |
| | | | | 165/104.31 |
| 2012/0297805 | A1* | 11/2012 | Kamada | B60H 1/00278 |
| | | | | 62/208 |
| 2013/0074525 | A1* | 3/2013 | Johnston | B60H 1/00278 |
| | | | | 62/56 |
| 2013/0118707 | A1* | 5/2013 | Kardos | B60H 1/00278 |
| | | | | 165/42 |
| 2014/0033761 | A1* | 2/2014 | Kawakami | B60H 1/00278 |
| | | | | 62/498 |
| 2014/0216693 | A1* | 8/2014 | Pekarsky | B60H 1/00278 |
| | | | | 165/104.31 |
| 2016/0129754 | A1* | 5/2016 | Rapp | B60H 1/00278 |
| | | | | 165/287 |

\* cited by examiner

HEATING, VENTILATION, AND AIR CONDITIONING SYSTEM FOR VEHICLE

CROSS-REFERENCE TO RELATED APPLICATION

This application claims the benefit of priority to Korean Patent Application No. 10-2017-0086414, filed on Jul. 7, 2017, in the Korean Intellectual Property Office, the disclosure of which is incorporated herein by reference in its entirety for all purposes.

TECHNICAL FIELD

The present disclosure relates to a Heating, Ventilation, and Air Conditioning (HVAC) system for a vehicle and, more particularly, to a HVAC system for a vehicle, which can simultaneously or separately perform indoor heating and temperature-raising of a high-voltage battery of a vehicle, and minimize the energy transfer to reduce energy consumption, thereby extending a driving distance of a vehicle.

DESCRIPTION OF RELATED ART

Recently, electric vehicles are widely being promoted in order to implement an eco-friendly technology and address issues such as energy exhaustion. An electric vehicle is operated using a motor which receives electricity from a battery to output power. Therefore, the electric vehicle has been in the spotlight, since the electric vehicle has advantages in that the electric vehicle emits no carbon dioxide, has very low noise level, and has a motor having an energy efficiency higher than that of an internal combustion engine.

One of the core technologies for realizing such an electric vehicle is a technology relating to a battery module. Recently, research on weight reduction, miniaturization, and shortening the charging time of the battery has been actively carried out. The battery module should be used in an optimal temperature environment to maintain optimal performance and long service life. However, it is difficult to use a battery module in an optimal temperature environment due to heat generated during operation and a change in outside temperature.

In addition, differently from an internal combustion engine, an electric vehicle uses an electric heating device for indoor heating in winter since the electric vehicle does not have a waste heat source generated by combustion in a separate engine, and the electric vehicle battery may have to be warmed in order to improve battery charge/discharge performance in cold weather. Therefore, the electric vehicle employs a separate electric coolant heating type heater. That is, in order to maintain an optimal temperature environment of a battery module, a cooling and heating system for controlling a temperature of the battery module is operated separately from a cooling and heating system for air conditioning in a vehicle. In other words, an electric vehicle employs two independent cooling and heating systems, one of which is used for indoor cooling and heating and the other of which is used for controlling a temperature of a battery module.

However, an electric vehicle operating in the method as described above may be unable to efficiently manage energy, thus has a short running distance, and may thus be unable to travel a long distance. Specifically, the driving distance of the electric vehicle may be reduced by 30% or more at the time of cooling in summer and by 40% or more at the time of heating in winter. Therefore, unlike a vehicle with an internal combustion engine, an electric vehicle may have a severe indoor heating problem in winter.

In particular, in the case of winter, the amount of heat generated by an electric component side may be larger than that of a high-voltage battery part, and a high-voltage battery has a large surface area in contact with air. Therefore, during the running of the vehicle in winter, the high-voltage battery is cooled by the outdoor temperature more than it is heated by the heat generated by the high-voltage battery, and the high-voltage battery may fail to reach a proper temperature for operation thereof and may thus output a lowered voltage. Therefore, in the winter, in order to efficiently manage a high-voltage battery, the high-voltage battery and an indoor space may need to be simultaneously heated during the running of the vehicle.

It should be understood that the foregoing description of the background art is merely for the purpose of promoting an understanding of the background of the present disclosure and is not to be construed as an admission that the description is a prior art known to a person skilled in the art.

SUMMARY

The present disclosure has been proposed in order to address the issues described above, and an aspect of the present disclosure is to provide a Heating, Ventilation, and Air Conditioning (HVAC) system for a vehicle, which can reduce the production cost and efficiently extend a driving distance by efficiently managing energy required for heating an indoor space and a battery of a vehicle.

A Heating, Ventilation, and Air Conditioning (HVAC) system for a vehicle according to the present disclosure includes: a battery circulation line including a battery radiator, a high-voltage battery, and a first valve arranged to allow a first coolant to circulate therethrough; a branch line selectively connected to the battery circulation line through the first valve and having a cooling heat exchanger configured to exchange heat with an indoor air conditioning refrigerant line; a battery heating line including a water heater, an indoor air conditioning heater core, and a second valve arranged to allow a second coolant to circulate therethrough, the battery heating line being selectively connected to the battery circulation line through the second valve; and a controller configured to control the first valve in stages, to cool the high-voltage battery, to control the second valve and the water heater to selectively heat the high-voltage battery, and to control the water heater or a cooling device on the indoor air conditioning refrigerant line to air condition the vehicle.

The branch line has one end branched from the first valve and the other end connected to a point upstream of the high-voltage battery and shares a part of a line including the high-voltage battery of the battery circulation line to configure a closed loop, such that the high-voltage battery may be cooled.

The first valve is a 3-way valve and includes a first port on a battery radiator side, a second port on the branch line side, and a third port on the high-voltage battery side. The controller is configured to close the first port of the first valve and the first coolant circulates in the branch line to exchange heat with the cooling heat exchanger when cooling the high-voltage battery.

The battery heating line further includes a bypass line having one end branched from the second valve and the other end connected to heater core, and the bypass line shares a part of a line including the water heater of the battery heating line to configure a closed loop, such that an indoor space may be heated.

The battery heating line further includes the bypass line having one end branched from the second valve and the other end connected to the heater core. The second valve is a 3-way valve and includes a first port on the battery circulation line side, a second port on the heater core side, and a third port on the water heater. The controller is configured to close a first port of the second valve and operates the heater core to enable the second coolant to circulate in the bypass line to exchange heat with the heater core when heating an indoor space.

The battery circulation line may include a first pump controlled by the controller, and the first pump may be disposed between a point upstream of the first valve and an end of the branch line not connected to the first valve.

The battery heating line may include a second pump controlled by the controller, and the second pump may be disposed between the heater core and the second valve and disposed in a line including the water heater.

The controller may be configured to control the number of revolutions of the second pump or the amount of opening of the second valve when the high-voltage battery and an indoor space are simultaneously heated.

In a cooling mode, the controller may be configured to control the first valve to circulate the first coolant in the branch line and the first coolant cooled by the cooling heat exchanger to cool the high-voltage battery.

In an indoor heating mode, the controller may be configured to control the second valve to circulate the second coolant in the bypass line and the second coolant heated by the water heater to heat an indoor space.

The second valve is a 3-way valve, and includes a first port on the battery circulation line side, a second port on the heater core side, and a third port on the water heater. The controller is configured to close the second port of the second valve, and connect the battery heating line in which the second coolant heated by the water heater or the heater core flows to the battery circulation line when heating the high-voltage battery.

In a battery heating mode, the controller may be configured to control the second valve to circulate the second coolant in the battery heating line and such that the second coolant heated by the water heater or the heater core to circulate in the battery heating line and heat exchange when heating the high-voltage battery.

In a battery heating mode, the controller may be configured to control the second coolant to be heated by the water heater to flow through the heater core to heat the high-voltage battery, and then flow into the water heater again, such that the second coolant circulates in the battery heating line to heat the high-voltage battery.

The second valve is a 3-way valve and includes a first port on the battery circulation line side, a second port on the heater core side, and a third port on the water heater side. The controller is configured to close the second port of the second valve such that the second coolant circulates in the battery heating line to exchange heat with the water heater and the heater core, and the battery heating line is connected to the battery circulation line when simultaneously heating the high-voltage battery and an indoor space.

The controller may be configured to control the second valve to circulate the second coolant in the battery heating line and the second coolant heated through heat exchange by the heater core or the water heater to simultaneously heating the high-voltage battery and an indoor space.

A heating heat exchanger may be further included at a point where the battery circulation line and the battery heating line are separated from each other. A first coolant of the battery circulation line and a second coolant of the battery heating line exchange heat with each other in the heating heat exchanger, such that the battery circulation line and the battery heating line are connected to each other.

The controller may be configured to control the first valve and the second valve to circulate the first coolant in the branch line and to control the second coolant to exchange heat while circulating through the heater core, the water heater, and the heating heat exchanger in the battery heating line, such that the second coolant heated by the water heater exchanges heat with the first coolant in the heating heat exchanger before heating the high-voltage battery.

The system may further include a direct circulation line through which coolant can bypass to a point upstream of the water heater at a point downstream of the heating heat exchanger.

According to a HVAC system for a vehicle configured as described above, the HVAC system can cool a high-voltage battery in a state in which it is connected to an outdoor or indoor air conditioning refrigerant line, can reduce energy consumption for heating each of an indoor air conditioning heater core and an indoor space by using coolant heated by a water heater for heating the indoor air conditioning heater core. Therefore, the HVAC system can increase a driving distance of a vehicle.

BRIEF DESCRIPTION OF DRAWINGS

The above and other aspects and features of the present disclosure will be more apparent from the following detailed description taken in conjunction with the accompanying drawings, in which.

DETAILED DESCRIPTION

Hereinafter, a Heating, Ventilation, and Air Conditioning (HVAC) system for a vehicle according to an embodiment of the present disclosure will be described with reference to the accompanying drawings.

FIGS. 1 to 5 illustrate each of modes of a HVAC system for a vehicle according to an embodiment of the present disclosure, respectively. FIGS. 6 to 10 illustrate each of modes of a HVAC system for a vehicle according to another embodiment of the present disclosure, respectively.

A HVAC system for a vehicle according to an embodiment of the present disclosure includes a battery circulation line 10 including a battery radiator 200, a high-voltage battery 100, and a first valve 810, which are arranged to allow a first coolant to circulate therethrough. The HVAC further includes a branch line 30 selectively connected to the battery circulation line 10 through the first valve 810 and having a cooling heat exchanger 400 which can exchange heat with an indoor air conditioning refrigerant line 50. A battery heating line 40 including a water heater 700, an indoor air conditioning heater core 930, and a second valve 820, which are arranged to allow a second coolant to circulate therethrough, is selectively connected to the battery circulation line 10 through the second valve 820. A controller 600 is configured to control the HVAC system to cool the high-voltage battery 100 by controlling the first valve 810 in stages, to selectively heat the high-voltage battery 100 by controlling the second valve 820 and the water heater 700, and to air-condition a vehicle by controlling the water heater 700 or a cooling device on the indoor air conditioning refrigerant line 50.

The controller 600 is an electric circuit which performs various functions described herein with execution of instructions embedded or stored on an external memory.

The battery circulation line 10 includes the battery radiator 200, the high-voltage battery 100, and the first valve 810, which are arranged to allow the first coolant to circulate therethrough. The battery circulation line 10 further includes a first pump 850 controlled to be operated or stopped by the controller 600. The first pump 850 is disposed on the battery circulation line 10, and is disposed between a point upstream of the first valve 810 and the other end of the branch line 30. More specifically, the first pump 850 may be disposed at any position between the other end of the branch line 30 and the first valve 810. Therefore, the first coolant may have an influence on the line through which the first coolant circulates regardless of whether the first coolant circulates in the battery circulation line 10 thereby circulating through the battery radiator 200, or in the branch line 30 in which the first coolant does not pass through the battery radiator 200.

The branch line 30 is selectively connected to the battery circulation line 10 through the first valve 810, and includes the cooling heat exchanger 400 for cooling the high-voltage battery 100. The cooling heat exchanger 400 is configured to exchange heat with the indoor air conditioning refrigerant line 50. Therefore, when using only the battery radiator 200 does not provide sufficient cooling, passing the first coolant through the cooling heat exchanger 400 for exchanging heat with a refrigerant of the refrigerant line 50 increases the cooling of the high-voltage battery 100. The branch line 30 has one end branched from the first valve 810 and the other end connected to a point upstream of the high-voltage battery 100 and shares a part of a line including the high-voltage battery 100 of the battery circulation line 10 to configure a closed loop, so that the high-voltage battery 100 can be cooled.

The refrigerant line 50 includes a compressor 800, an air-cooled condenser 900, an expansion valve 830, and an evaporator 910. In addition, the refrigerant line 50 includes a line that is branched such that a refrigerant of the refrigerant line 50 can exchange heat in the cooling heat exchanger 400, and the branched line includes an auxiliary valve 840 controlled by the controller 600 to supply or block a refrigerant to the cooling heat exchanger 400. Thus, when the high-voltage battery 100 is being cooled, the first coolant, after having exchanged heat with the refrigerant line 50, cools the high-voltage battery 100.

The refrigerant line 50 further includes the indoor air conditioning heater core 930. The heater core 930 may be heated by the circulation of a refrigerant in the refrigerant line 50, or may be heated by electricity or a PTC element or may be heated by the second coolant. In the present disclosure, the case of a "core" heated by the second coolant is shown and described, but this is an embodiment for reducing power consumption in a case of an Electric Vehicle (EV) and is not limited to such a configuration.

The first valve 810 is a 3-way valve and includes a first port 811 on the battery radiator 200 side, a second port 812 on the branch line 30 side, and a third port 813 on the high-voltage battery 100 side. The first valve 810 is controlled to be opened or closed by the controller 600. The first valve 810 may be a thermostat. The detailed operation thereof will be described later.

The battery heating line 40 includes the water heater 700, the heater core 930, and the second valve 820, arranged to allow the second coolant to circulate therethrough. The battery heating line 40 is selectively connected to the battery circulation line 10 through the second valve 820. The second coolant circulates in the order of the heater core 930, the second valve 820, and the water heater 700 in a first embodiment, and circulates in the order of the heater core 930, the water heater 700, and the second valve 820 in a second embodiment. However, the present disclosure is not limited to such a configuration.

In addition, the battery heating line 40 further includes a bypass line 60 having one end branched from the second valve 820 and the other end connected to the heater core 930. The bypass line 60 shares a part of a line including the water heater 700 of the battery heating line 40 to configure a closed loop, so that an indoor space is heated.

The battery heating line 40 further includes a second pump 870 controlled by the controller 600. The second pump 870 is disposed between the heater core 930 and the second valve 820 and is disposed in a line including the water heater 700. Thus, regardless of whether the second coolant circulates in the battery heating line 40 or the bypass line 60, the second coolant may have an influence on the line through which the second coolant circulates.

For example, when heating the high-voltage battery 100 and indoor heating are performed simultaneously, the controller 600 may control the number of revolutions of the second pump 870 or the amount of opening of the second valve 820 so as to control a flow rate. This is because it is desirable to have the heater core 930 at a temperature of 60 degrees or higher for indoor heating and at a temperature of less than 60 degrees for heating the high-voltage battery 100. In an embodiment where the high-voltage battery 100 is a lithium ion battery, a temperature higher than 60 degrees may increase the possibility of catastrophic failure of the battery. As a minimum temperature condition of a vehicle for indoor heating, a coolant temperature of at least 60 degrees or higher is required to maintain an air vent discharge temperature of about 40 degrees at low speed (50 km/h). Thus, in the present disclosure, temperatures appropriate to the heater core 930 and the high-voltage battery 100, respectively, may be provided by controlling the amount of opening of the second valve 820 or the number of revolutions of the second pump 870.

The second valve 820 is a 3-way valve and includes a first port 821 on the battery circulation line 10 side, a second port 822 on the heater core 930 side, and a third port 823 on the water heater 700 side. Detailed operation of the second valve 820 will be described later.

The controller 600 controls to cool the high-voltage battery 100 through a control of the first valve 810 in stages, to selectively heat the high-voltage battery 100 through a control of the second valve 820 and the water heater 700, and to air-condition a vehicle through a control of the water heater 700 or a cooling device on the indoor air conditioning refrigerant line 50. The operations of the controller 600 will be described later with reference to the drawings.

The HVAC system for a vehicle according to an embodiment of the present disclosure further includes an electric component cooling line 20 including an electric radiator 300 and an electric component core 500, in which third coolant independently circulates. The electric component cooling line 20 includes a third pump 860, and the controller 600 operates or stops the third pump 860. The third pump 860 may be disposed anywhere in a closed loop.

The flow of coolant in each mode will be described with reference to the drawings.

Figure 1:
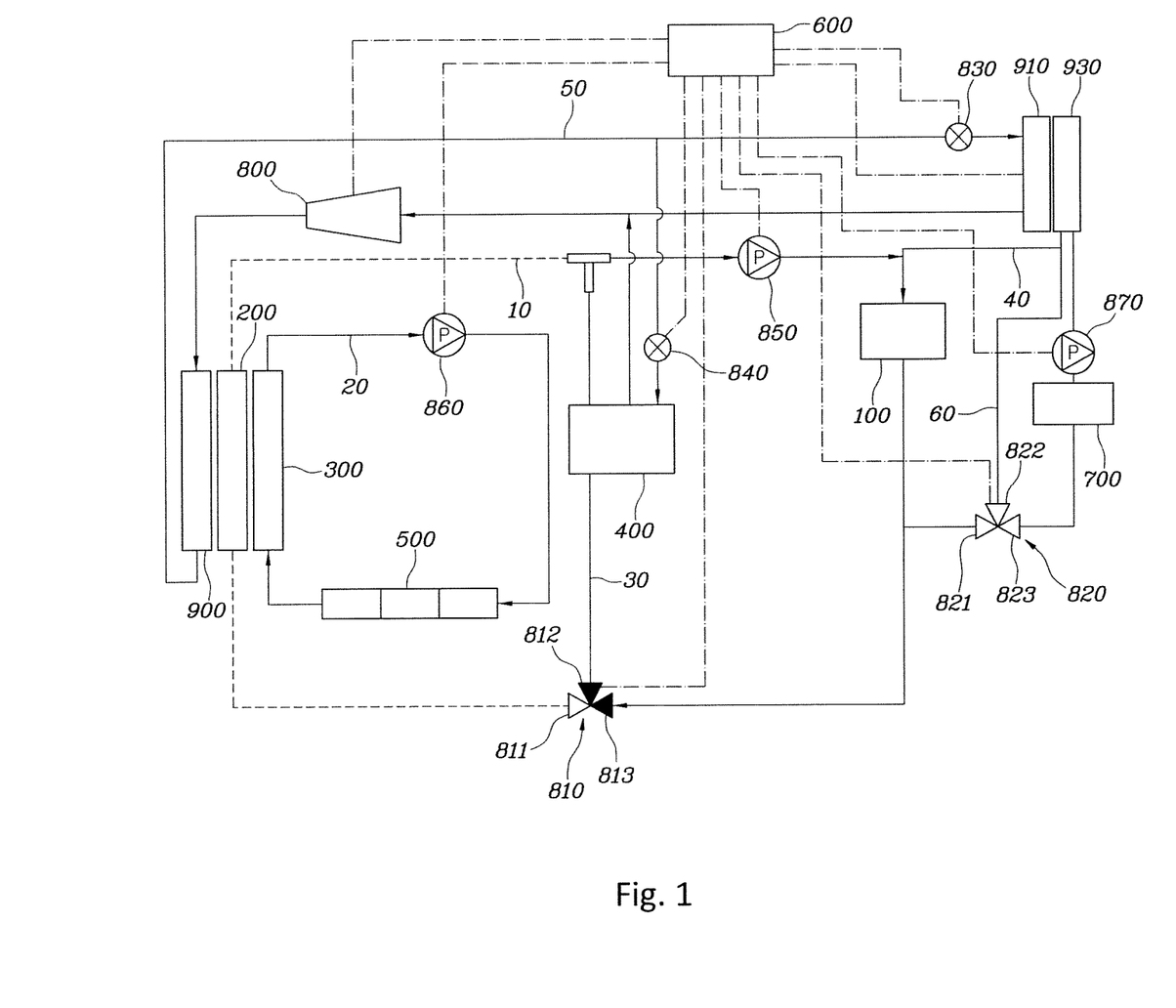
FIG. 1 illustrates a cooling mode of an HVAC system for a vehicle according to an embodiment of the present disclosure.
Figure 6:
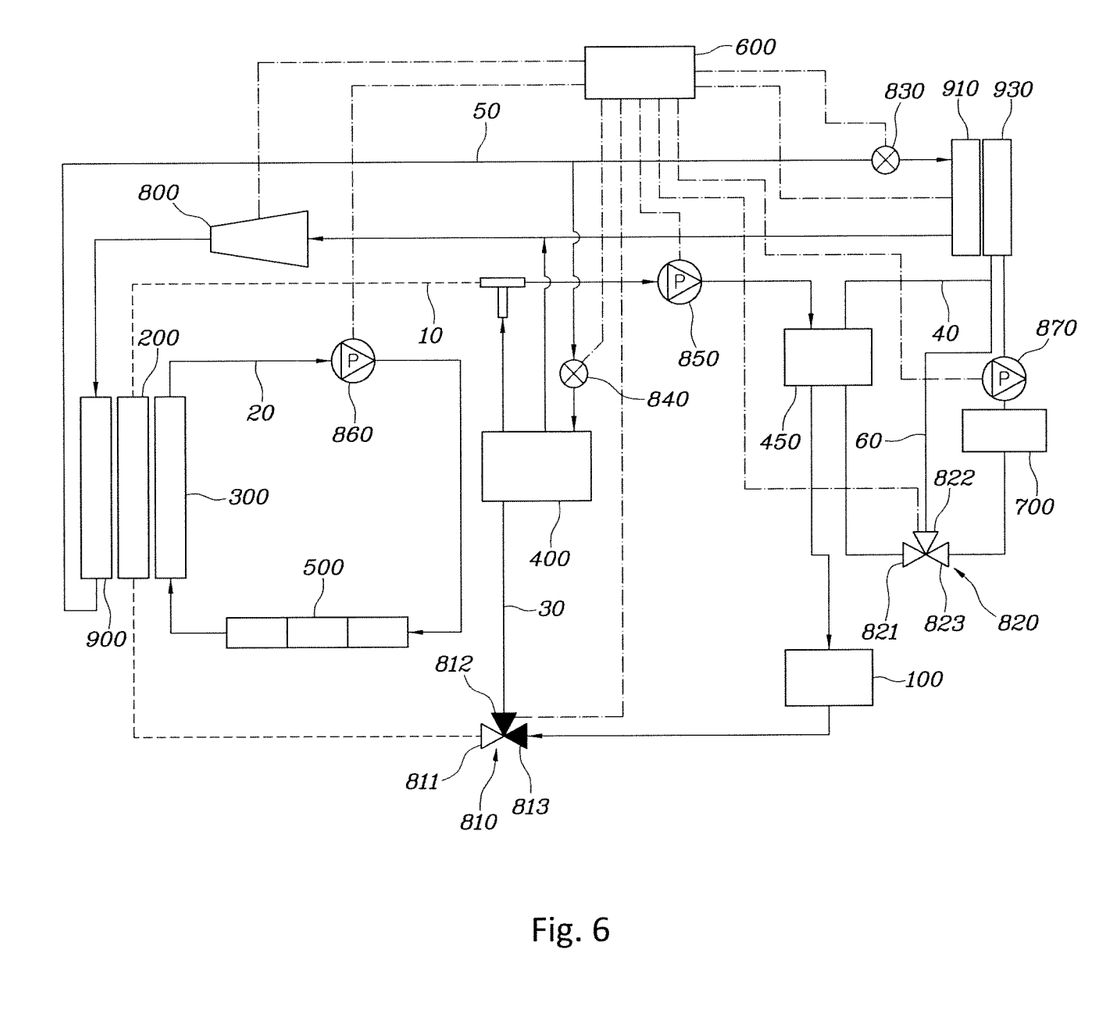
FIG. 6 illustrates a cooling mode of an HVAC system for a vehicle according to another embodiment of the present disclosure.

FIGS. 1 and 6 illustrate a cooling mode of an HVAC system for a vehicle according to an embodiment of the present disclosure. The operations in the first embodiment (FIG. 1) and the second embodiment (FIG. 6) are the same. In a cooling mode, the controller 600 controls the first valve 810 to circulate the first coolant in the branch line 30 and controls the first coolant cooled by the cooling heat exchanger 400 disposed in the branch line 30 to cool the high-voltage battery 100. That is, when the high-voltage battery 100 is to be cooled, the controller 600 closes a first port 811 of the first valve 810, connects the second port 812 to the third port 813, and controls the first coolant to circulate in the branch line 30.

In addition, the controller 600 controls an auxiliary valve 840 of the refrigerant line 50 and controls a refrigerant of the refrigerant line 50 to exchange heat with the first coolant in the cooling heat exchanger 400. Thus, the first coolant is cooled through heat exchange in the cooling heat exchanger 400, the cooled first coolant flows to the high-voltage battery 100 through the first pump 850, and thus the high-voltage battery 100 is cooled by the first coolant.

Figure 2:
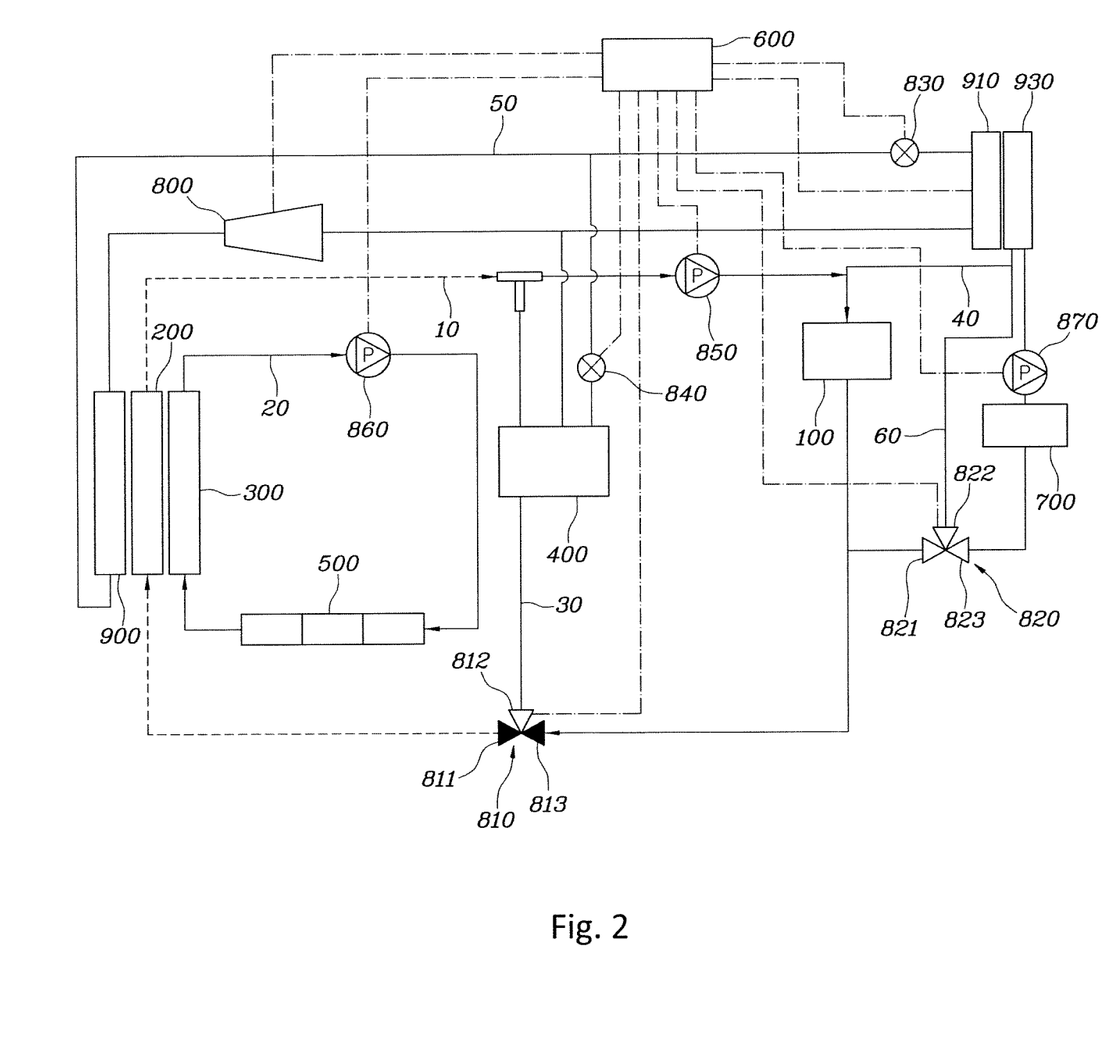
FIG. 2 illustrates an outdoor temperature cooling mode of an HVAC system for a vehicle according to an embodiment of the present disclosure.
Figure 7:
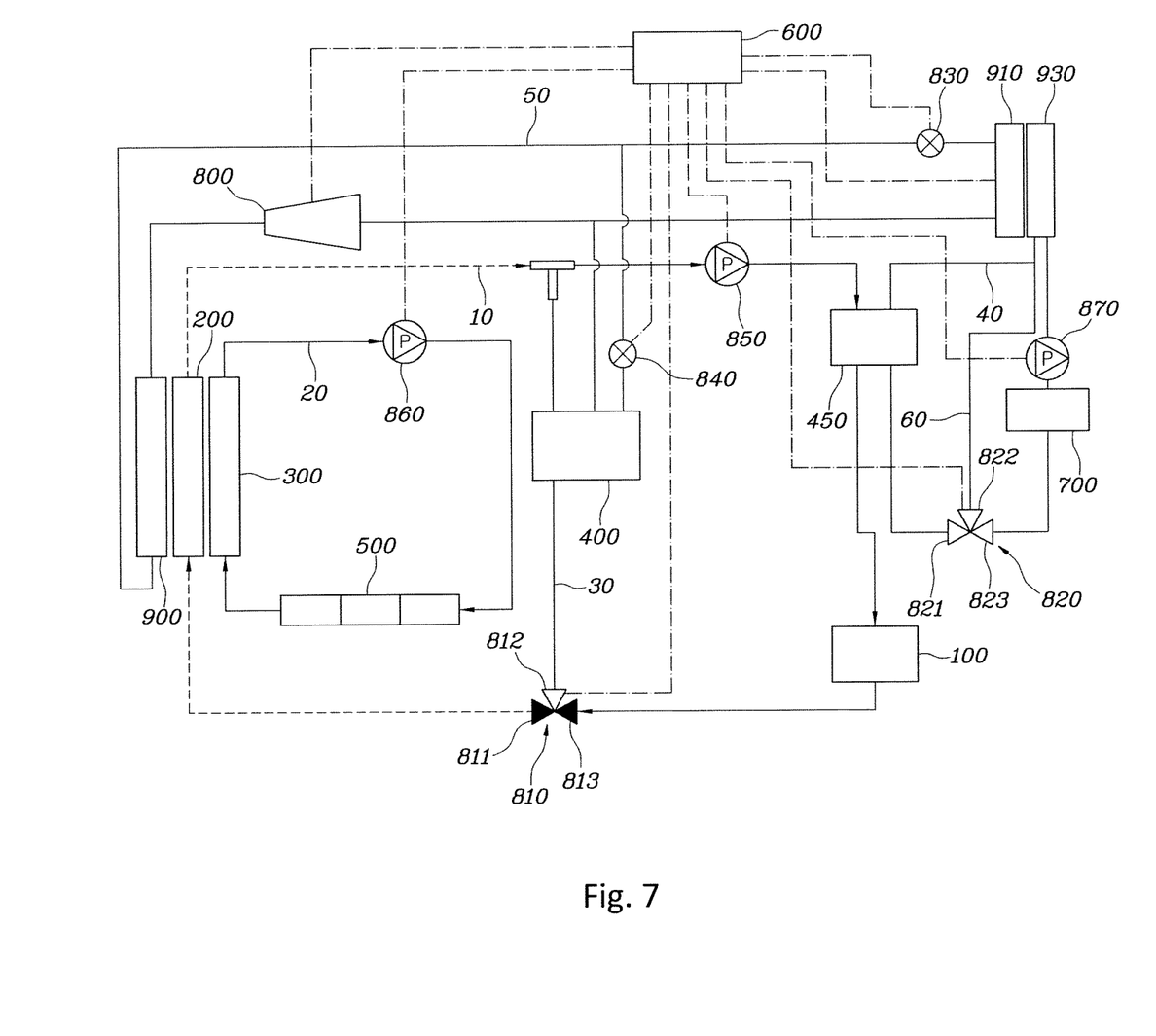
FIG. 7 illustrates an outdoor temperature cooling mode of an HVAC system for a vehicle according to another embodiment of the present disclosure.

FIGS. 2 and 7 illustrate an outdoor temperature cooling mode of a HVAC system for a vehicle according to an embodiment of the present disclosure. The operations in the first embodiment and the second embodiment are the same. In an outdoor temperature cooling mode, the controller 600 controls the first valve 810 to circulate the first coolant in the battery circulation line 10 and controls the first coolant cooled by the battery radiator 200 to cool the high-voltage battery 100. That is, when the high-voltage battery 100 is to be cooled naturally by an outdoor temperature, the controller 600 closes a second port 812 of the first valve 810, connects the first port 811 to the third port 813, and controls the first coolant to circulate in the battery circulation line 10. Thus, the first coolant is cooled through heat exchange with an outdoor air through the battery radiator 200, the cooled first coolant flows to the high-voltage battery 100 through the first pump 850, and thus the high-voltage battery 100 is cooled by the first coolant.

Figure 4:
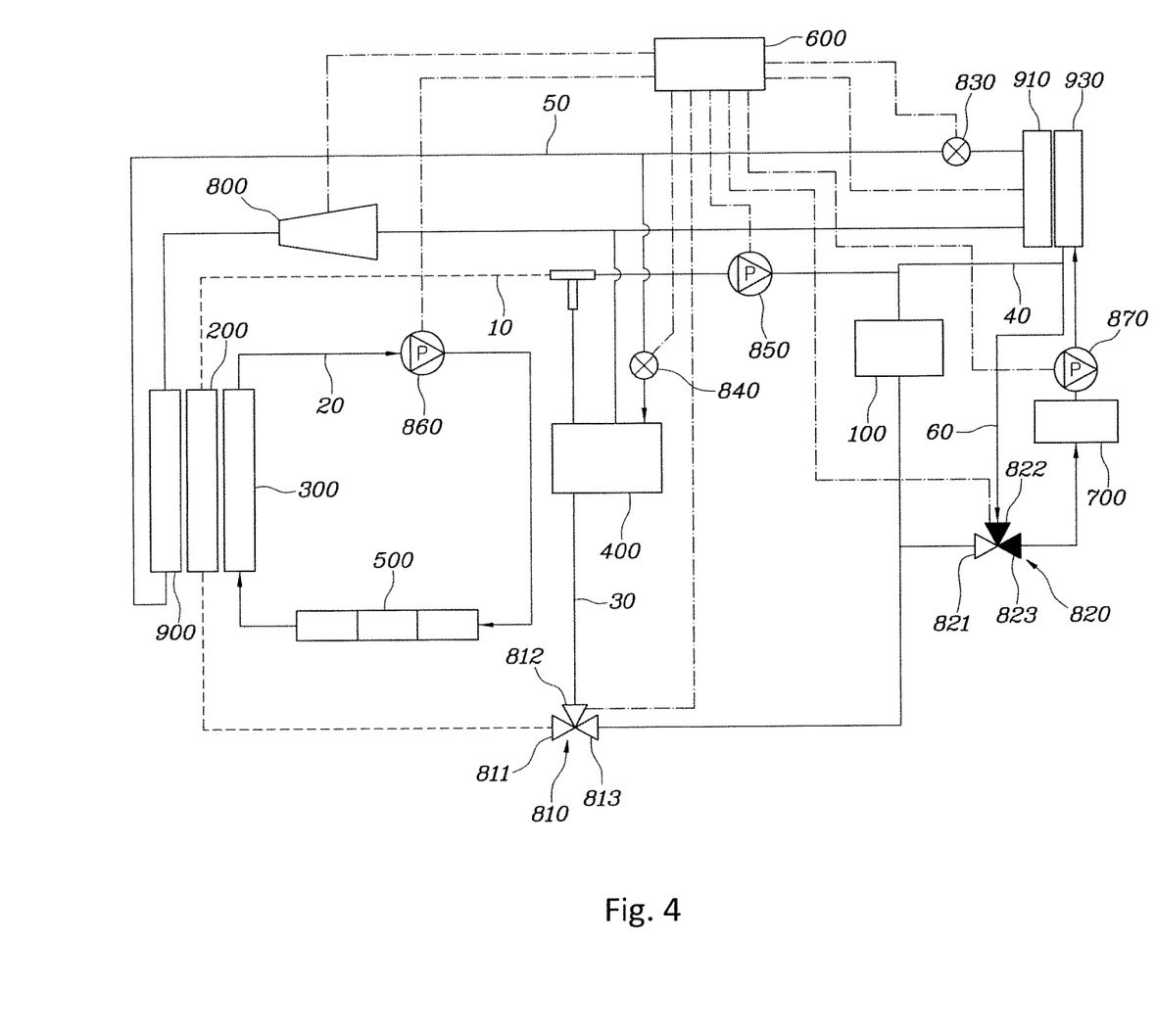
FIG. 4 illustrates an indoor heating mode of an HVAC system for a vehicle according to an embodiment of the present disclosure.
Figure 9:
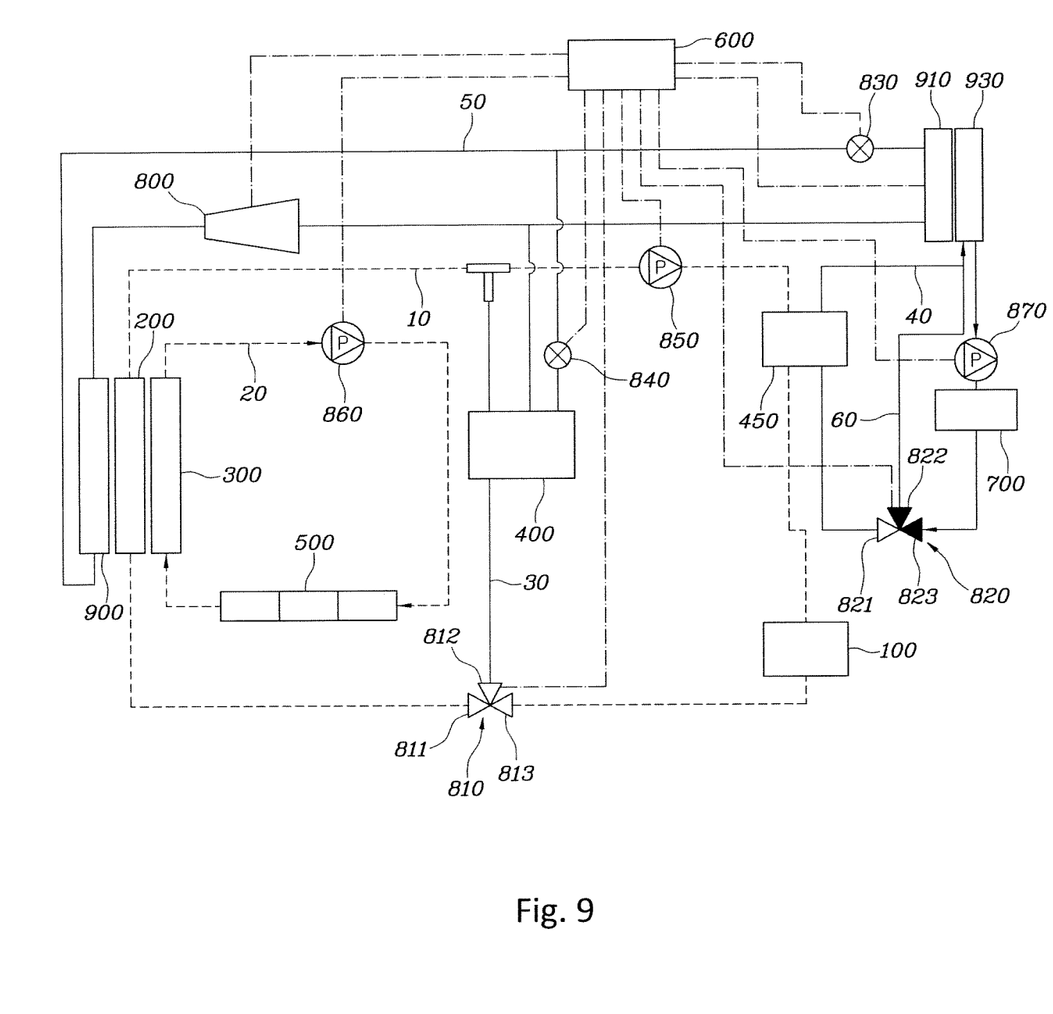
FIG. 9 illustrates an indoor heating mode of an HVAC system for a vehicle according to another embodiment of the present disclosure.

FIGS. 4 and 9 illustrate a cooling mode of an HVAC system for a vehicle according to an embodiment of the present disclosure, wherein only directions of the second coolant in the first embodiment and the second embodiment are opposite and the operations thereof are the same, but circulation directions of the second coolant may be the same. In an indoor heating mode, the controller 600 controls the second valve 820 to circulate the second coolant in the bypass line 60, and controls the second coolant heated by the water heater 700 to heat an indoor space. That is, when an indoor space is to be heated, the controller 600 closes the first port 821 of the second valve 820, connects the second port 822 to the third port 823, and operates the heater core 930. Thus, the second coolant is heated by the water heater 700, and then circulates in the bypass line 60 to exchange heat with the heater core 930, so that an indoor space is heated. The second coolant circulates through the second pump 870.

Figure 3:
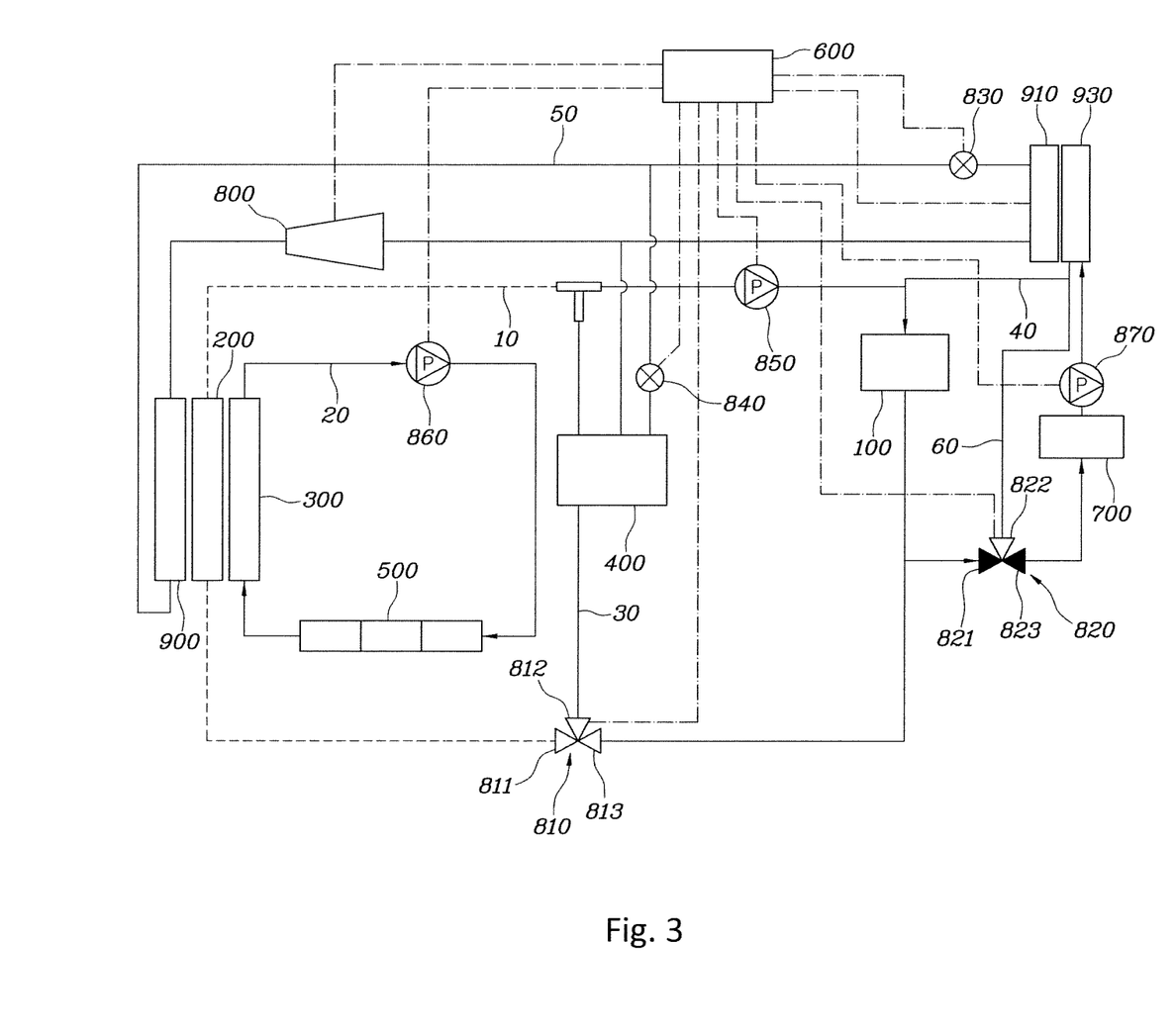
FIG. 3 illustrates a battery heating mode of an HVAC system for a vehicle according to an embodiment of the present disclosure.

FIG. 3 illustrates a battery heating mode of an HVAC system for a vehicle according to an embodiment of the present disclosure. In a battery heating mode, the controller 600 controls the second valve 820 to circulate the second coolant in the battery heating line 40, and the second coolant heated by the water heater 700 or the heater core 930 reaches to the high-voltage battery 100 of the battery circulation line 10 so that the high-voltage battery 100 is heated. That is, when the high-voltage battery 100 is required to be heated, the controller 600 closes the second port 822 of the second valve 820, connects the first port 821 to the third port 823, and controls the second coolant to circulate in the battery heating line 40 and reach to the high-voltage battery 100 of the battery circulation line 10.

Thus, the second coolant heated by the water heater 700 flows to the high-voltage battery 100 through the heater core 930 so that the high-voltage battery 100 is heated. That is, in a battery heating mode, the controller 600 controls the second coolant to heat the high-voltage battery 100 through the heater core 930 after the second coolant is heated by the water heater 700 and then to flow into the water heater 700 again. Thus, the second coolant circulates in the battery heating line 40 to heat the high-voltage battery 100. Otherwise, in a case of the heater core 930 operated by the refrigerant line 50 or by electricity, the second coolant is heated by the heater core 930 even if the water heater 700 is not operated, and the heated second coolant flows to the high-voltage battery 100 so that the high-voltage battery 100 is heated.

Figure 5:
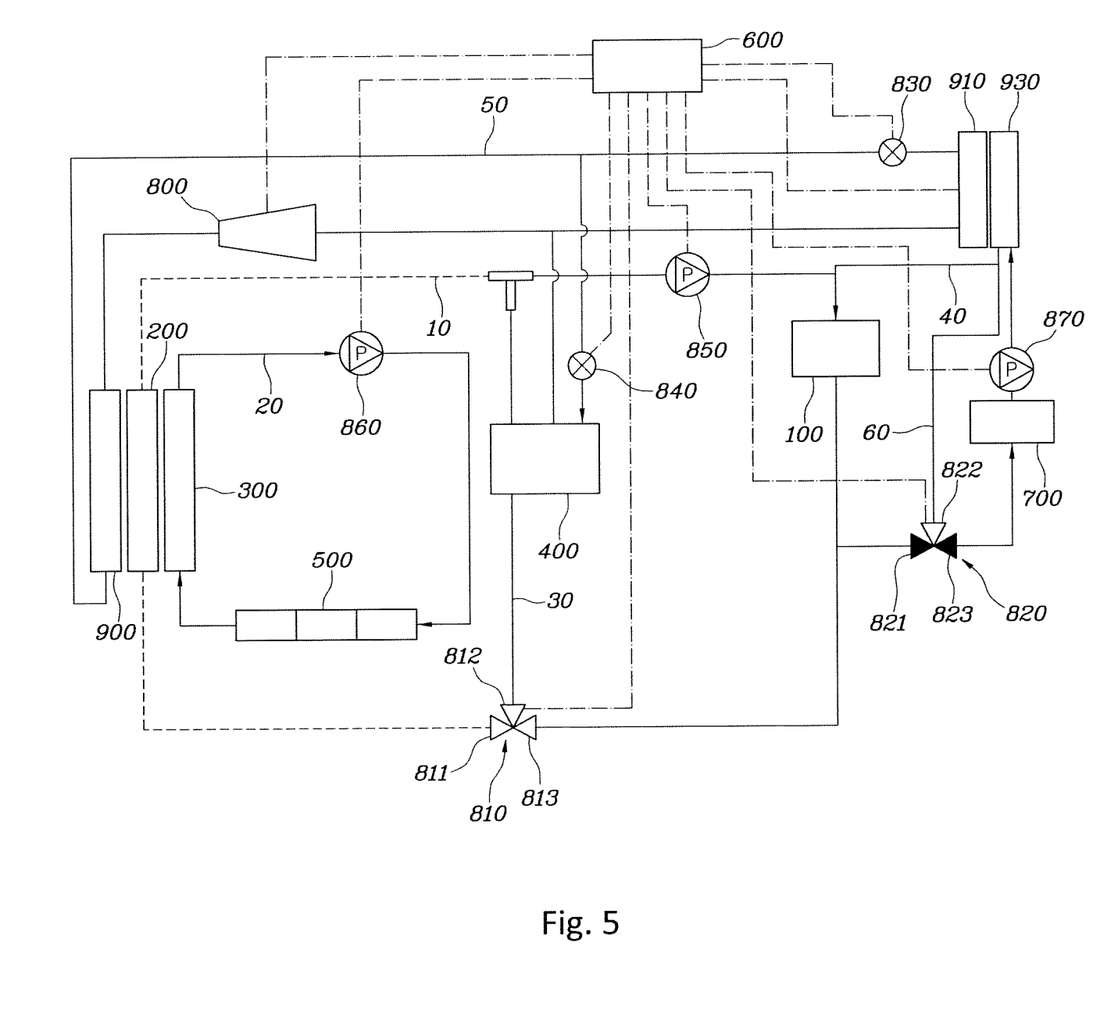
FIG. 5 illustrates an HVAC system for a vehicle according to an embodiment of the present disclosure, which simultaneously has a battery heating mode and an indoor heating mode.

FIG. 5 illustrates an HVAC system for a vehicle according to an embodiment of the present disclosure, which simultaneously performs a battery heating mode and an indoor heating mode. In a case where a battery heating mode and an indoor heating mode are simultaneously performed, the controller 600 controls the second valve 820 to circulate the second coolant in the battery heating line 40 and controls the second coolant heated through heat exchange by the heater core 930 or the water heater 700 to simultaneously heat the high-voltage battery 100 and an indoor space. That is, in a case where the high-voltage battery 100 and an indoor space are simultaneously required to be heated, the controller 600 closes the second port 822 of the second valve 820 and connects the first port 821 to the third port 823 so as to circulate the second coolant in the battery heating line 40 and connect to the high-voltage battery 100 of the battery circulation line 10.

Accordingly, the second coolant heated to 60 degrees or higher through the water heater 700 heats an indoor space through the heater core 930, and the second coolant having a temperature lower than 60 degrees after heating the indoor space flows to the high-voltage battery 100, so that the high-voltage battery 100 is heated. Otherwise, in the case of the heater core 930 operated by the refrigerant line 50 or by electricity, even if the water heater 700 is not operated, the second coolant is heated by the heater core 930 to heat an indoor space, and the second coolant having a lowered temperature after performing indoor heating flows to the high-voltage battery 100, so as to heat the high-voltage battery 100. In this case, a temperature of the second coolant supplied to the heater core 930 and the high-voltage battery 100 may be controlled by controlling the number of revolutions of the second pump 870 or the amount of opening of the second valve 820.

Figure 8:
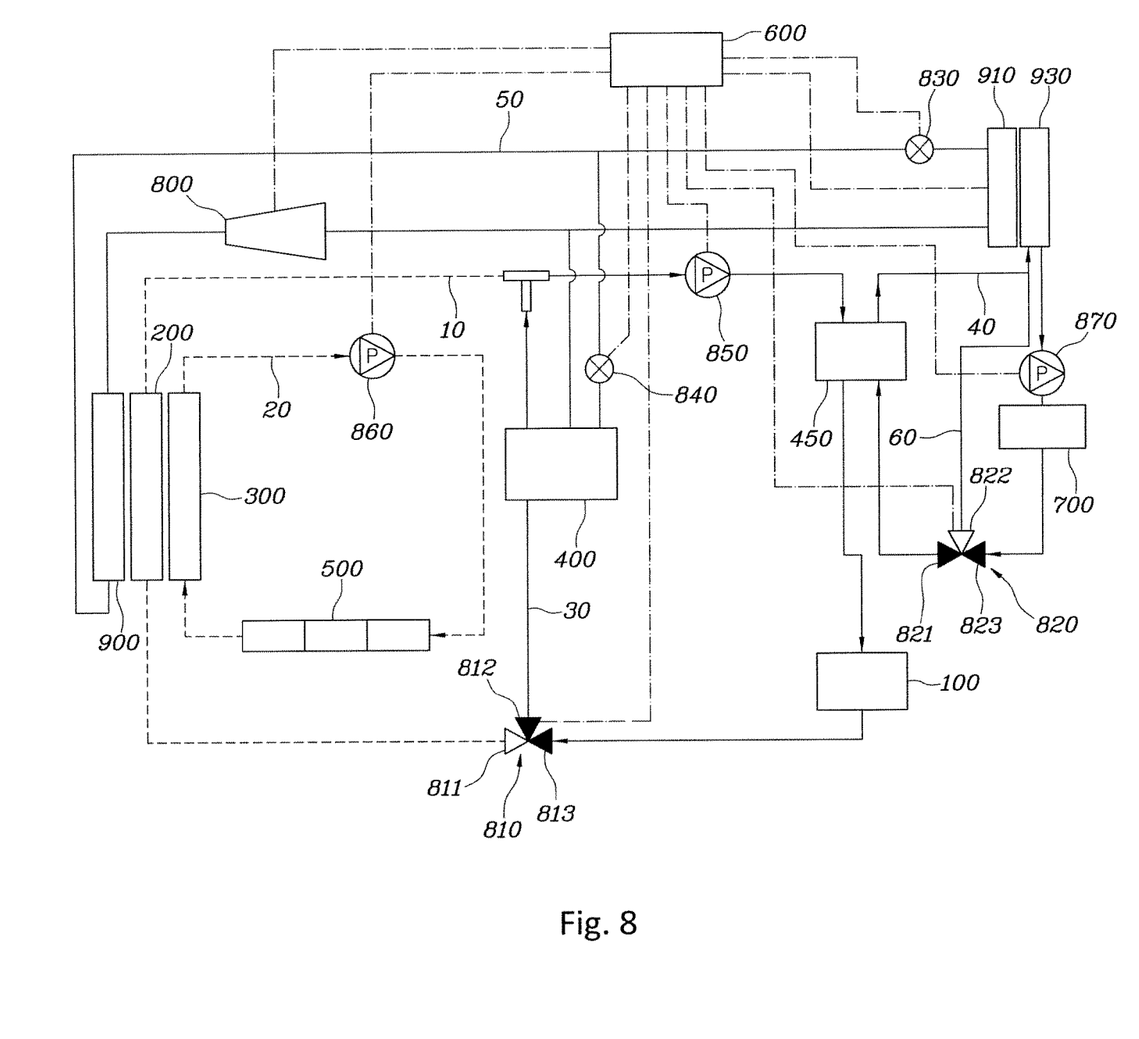
FIG. 8 illustrates a battery heating mode of an HVAC system for a vehicle according to another embodiment of the present disclosure.
Figure 10:
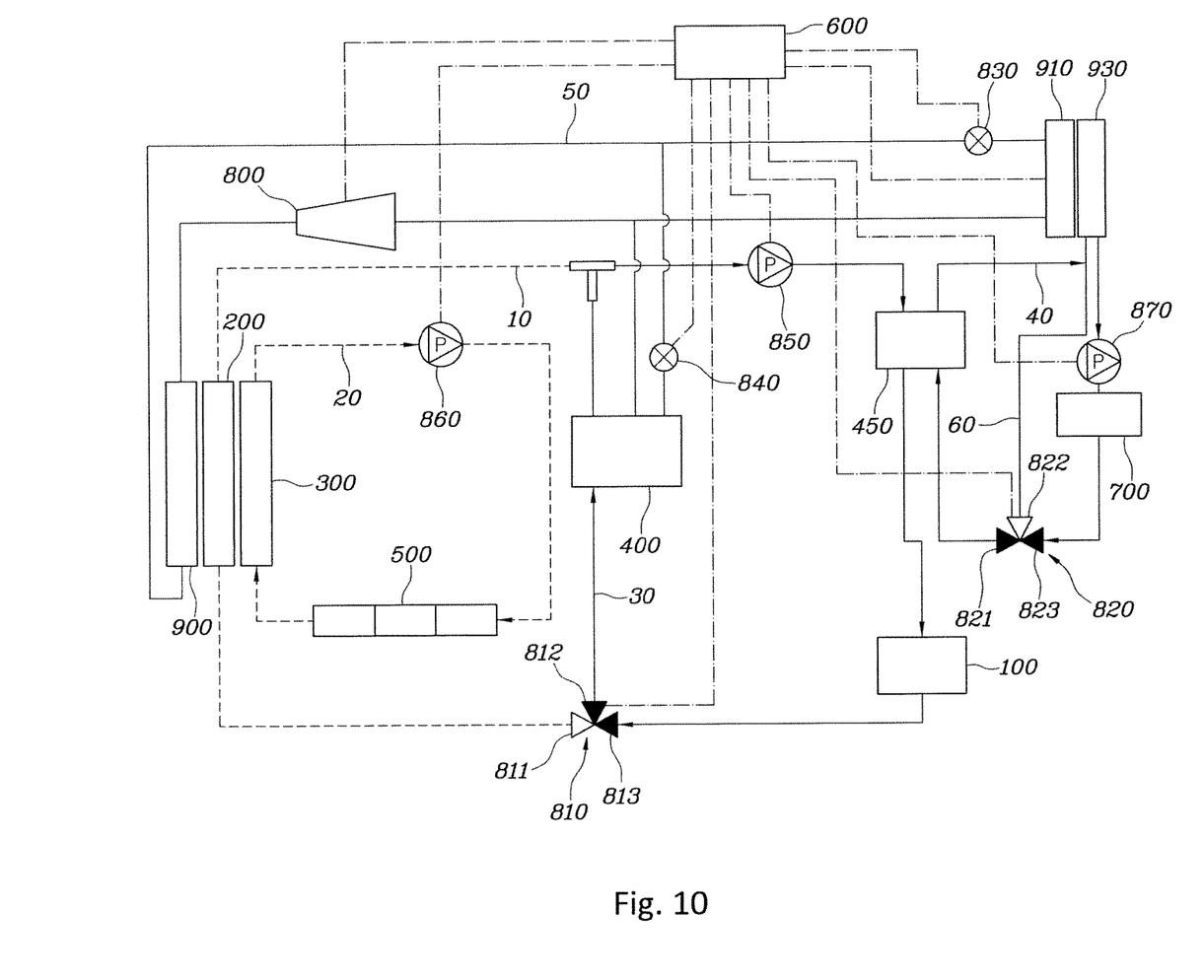
FIG. 10 illustrates an HVAC system for a vehicle according to another embodiment of the present disclosure, which simultaneously performs a battery heating mode and an indoor heating mode.

FIG. 8 illustrates a battery heating mode of an HVAC system for a vehicle according to another embodiment of the present disclosure. FIG. 10 illustrates an HVAC system for a vehicle according to another embodiment of the present disclosure, which simultaneously performs a battery heating mode and an indoor heating mode. In the second embodiment of the present disclosure, a heating heat exchanger 450 is further included at a point where the battery circulation line 10 and the battery heating line 40 are separated from each other. Thus, the second coolant in the battery circulation line 10 and the battery heating line 40 exchanges heat with each other in heating heat exchanger 450, so that the battery circulation line 10 and the battery heating line 40 are connected to each other. The heating heat exchanger 450 may be disposed at a position upstream or downstream of the high-voltage battery 100. However, disposing the heating heat exchanger 450 at a point upstream of the high-voltage battery 100 may improve efficiency of heating the high-voltage battery 100.

In the second embodiment of the present disclosure, the controller 600 controls the first valve 810 and the second valve 820 such that the first coolant circulates in the branch line 30 and the second coolant exchanges heat while circulating through the heater core 930, the water heater 700, and the heating heat exchanger 450 in the battery heating line 40. Further, the controller 600 controls the second coolant heated by the water heater 700 or the heater core 930 to exchange heat with the first coolant in the heating heat exchanger 450 and then heat the high-voltage battery 100. This will be described in more detail with reference to the drawings.

FIG. 8 illustrates a battery heating mode of an HVAC system for a vehicle according to an embodiment of the present disclosure. In a case of a battery heating mode, the controller 600 controls the first valve 810 and the second valve 820 to circulate the first coolant in the branch line 30 and to circulate the second coolant in the battery heating line 40. Further, the controller 600 controls the second coolant heated by the water heater 700 to exchange heat with the first coolant in the heating heat exchanger 450 to heat the high-voltage battery 100. That is, when the high-voltage battery 100 is required to be heated, the controller 600 closes the first port 811 of the first valve 810 to connect the second port 812 to the third port 813, and closes the second port 822 of the second valve 820 to connect the first port 821 to the third port 823, so that the battery heating line 40 is connected to the battery circulation line 10.

Thus, the first coolant circulates in the branch line 30, the second coolant circulates in the battery heating line 40, and the first coolant and the second coolant can exchange heat with each other through the battery circulation line 10 and the heating heat exchanger 450. Accordingly, the second coolant heated by the water heater 700 exchanges heat with the first coolant in heating heat exchanger 450, and recirculates to the water heater 700 through the heater core 930. The first coolant is heated in heating heat exchanger 450 and then heats the high-voltage battery 100. Then, the first coolant recirculates in the branch line 30 and circulates in the heating heat exchanger 450.

In the case of the heater core 930 operated by the refrigerant line 50 or by electricity, even if the water heater 700 is not operated, the second coolant is heated by the heater core 930, the heated second coolant exchanges heat with the first coolant in the heating heat exchanger 450, and the heated first coolant flows to the high-voltage battery 100 so as to heat the high-voltage battery 100. In particular, in a case where the high-voltage battery 100 is heated, a direct circulation line through which coolant can bypass to a point upstream of the water heater 700 is further included at a point downstream of the heating heat exchanger 450, so that the high-voltage battery 100 may be heated although the second coolant does not circulate through the heater core 930.

FIG. 10 illustrates an HVAC system for a vehicle according to another embodiment of the present disclosure, which simultaneously performs a battery heating mode and an indoor heating mode. In a case where a battery heating mode and an indoor heating mode are simultaneously performed, the controller 600 controls the first valve 810 and the second valve 820 to circulate the first coolant in the branch line 30 and to circulate the second coolant in the battery heating line 40. Further, the controller 600 controls the second coolant heated by the water heater 700 to exchange heat in the heating heat exchanger 450 and the heater core 930 and simultaneously heat the high-voltage battery 100 and an indoor space.

That is, in a case where the high-voltage battery 100 and an indoor space are simultaneously required to be heated, the controller 600 closes the first port 811 of the first valve 810 to connect the second port 812 to the third port 813, and closes the second port 822 of the second valve 820 to connect the first port 821 to the third port 823, so that the battery heating line 40 is connected to the battery circulation line 10. Thus, the first coolant circulates in the branch line 30, the second coolant circulates in the battery heating line 40, and the first coolant and the second coolant can exchange heat with each other through the battery circulation line 10 and the heating heat exchanger 450.

Accordingly, the second coolant heated by the water heater 700 exchanges heat with the first coolant in heating heat exchanger 450, heats an indoor space, and then recirculates to the water heater 700 through the heater core 930. The first coolant is heated in heating heat exchanger 450 and then heats the high-voltage battery 100. Then, the first coolant recirculates in the branch line 30 and circulates in the heating heat exchanger 450. At this time, the second coolant of an appropriate temperature may be supplied to the heater core 930 and the high-voltage battery 100, respectively, by controlling the amount of opening of the second valve 820 or the number of revolutions of the second pump 870. Accordingly, the high-voltage battery 100 can be heated and indoor heating can be performed simultaneously.

In the case of the heater core 930 operated by the refrigerant line 50 or by electricity, even if the water heater 700 is not operated, the second coolant is heated by the heater core 930, the heated second coolant exchanges heat with the first coolant in the heating heat exchanger 450, and the heated first coolant flows to the high-voltage battery 100 so as to heat the high-voltage battery 100.

For example, in the second embodiment, the high-voltage battery 100 can be cooled through the battery circulation line 10 and indoor heating can be performed simultaneously. In addition, in the second embodiment, the battery circulation line 10 capable of cooling the high-voltage battery 100 and the battery heating line 40 capable of heating the high-voltage battery 100 and an indoor space are separated from each other, and the battery heating line 40 includes the bypass line 60 in which coolant can bypass through the second valve. Thus, the second embodiment may include an independent coolant line configured to prevent the second coolant having a high temperature equal to or higher than a predetermined temperature from flowing into the high-voltage battery 100 when a temperature is not controlled since the water heater 700 is broken, and enable the second coolant having passed through the heater core 930 to perform heat exchange in the heating heat exchanger 450 and thus heat the high-voltage battery 100.

An HVAC system in accordance with various embodiments of the present disclosure can cool a high-voltage battery 100 in a state in which it is connected to an outdoor or indoor air conditioning refrigerant line 50, can reduce energy consumption for heating each of an indoor air conditioning heater core 930 and an indoor space by using coolant heated by a water heater 700 for heating the indoor air conditioning heater core 930. Thus, an HVAC system in accordance with the present disclosure can increase a driving distance of a vehicle.

Although the present disclosure has been shown and described with respect to the specific embodiments, it will be apparent to a person skilled in the art that various modifications and variations can be made in the present disclosure without departing from the technical idea of the present disclosure, which is provided by the following claims.

What is claimed is:

1. A Heating, Ventilation, and Air Conditioning (HVAC) system for a vehicle, comprising:
   a battery circulation line comprising a battery radiator, a high-voltage battery, and a first valve, arranged to allow a first coolant to circulate therethrough;
   a branch line selectively connected to the battery circulation line through the first valve and having a cooling heat exchanger configured to exchange heat with an indoor air conditioning refrigerant line;
   a battery heating line comprising the high-voltage battery commonly with the battery circulation line, a water heater, an indoor air conditioning heater core, and a second valve, the battery heating line being arranged such that a second coolant circulates therethrough in an order of the indoor air condition heater core, the high-voltage battery, the second valve, and the water heater, wherein the battery heating line is selectively connected to the battery circulation line through the second valve; and
   a controller configured to control the first valve in stages to cool the high-voltage battery, to control the second valve and the water heater to selectively heat the high-voltage battery, and to control the water heater or a cooling device on the indoor air conditioning refrigerant line to air condition the vehicle.

2. The system of claim 1, wherein the branch line has one end branched from the first valve and the other end connected to a point upstream of the high-voltage battery and shares a part of a line including the high-voltage battery of the battery circulation line to configure a closed loop, such that the high-voltage battery is cooled.

3. The system of claim 1, wherein the first valve is a 3-way valve and comprises a first port on a battery radiator side, a second port on the branch line side, and a third port on the high-voltage battery side, and the controller is configured to close the first port of the first valve to enable the first coolant to circulate in the branch line to exchange heat with the cooling heat exchanger, when cooling the high-voltage battery.

4. The system of claim 1, wherein the battery heating line further comprises a bypass line having one end branched from the second valve and the other end connected to the heater core, and the bypass line shares a part of a line including the water heater of the battery heating line to configure a closed loop, such that an indoor space is heated.

5. The system of claim 4, wherein the the second valve is a 3-way valve and comprises a first port on the battery circulation line side, a second port on the heater core side, and a third port on the water heater side, and the controller is configured to close a first port of the second valve and operates the heater core to enable the second coolant to circulate in the bypass line to exchange heat with the heater core when heating an indoor space.

6. The system of claim 1, wherein the battery circulation line comprises a first pump controlled by the controller, and the first pump is disposed between a point upstream of the first valve and an end of the branch line not connected to the first valve.

7. The system of claim 6, wherein the battery heating line comprises a second pump controlled by the controller, and the second pump is disposed between the heater core and the second valve and is disposed in a line including the water heater.

8. The system of claim 7, wherein, the controller is configured to control a number of revolutions of the second pump or an amount of opening of the second valve when simultaneously heating the high-voltage battery and the indoor space.

9. The system of claim 1, wherein, in a cooling mode, the controller is configured to control the first valve to circulate the first coolant in the branch line and the first coolant cooled by the cooling heat exchanger to cool the high-voltage battery.

10. The system of claim 1, wherein, in an indoor heating mode, the controller is configured to control the second valve to circulate the second coolant in the bypass line and the second coolant heated by the water heater to heat the indoor space.

11. The system of claim 1, wherein the second valve is a 3-way valve and includes a first port on the battery circulation line side, a second port on the heater core side, and a third port on the water heater side, and, the controller is configured to close the second port of the second valve, and connect the battery heating line in which the second coolant heated by the water heater or by the heater core flows to the battery circulation line, when heating the high-voltage battery.

12. The system of claim 1, wherein, in a battery heating mode, the controller is configured to control the second valve to circulate the second coolant in the battery heating line, such that the second coolant heated by the water heater or by the heater core circulates in the battery heating line to exchange heat when heating the high-voltage battery.

13. The system of claim 1, wherein, in a battery heating mode, the controller is configured to control the second coolant to be heated by the water heater to flow through the heater core to heat the high-voltage battery, and then flow into the water heater again, such that the second coolant circulates in the battery heating line to heat the high-voltage battery.

14. The system of claim 1, wherein the second valve is a 3-way valve and includes a first port on the battery circulation line side, a second port on the heater core side, and a third port on the water heater side, and the controller is configured to close the second port of the second valve such that the second coolant circulates in the battery heating line to exchange heat with the water heater and the heater core, and the battery heating line is connected to the battery circulation line when simultaneously heating the high-voltage battery and the indoor space.

15. The system of claim 1, wherein the controller is configured to control the second valve to circulate the second coolant in the battery heating line and control the second coolant heated through heat exchange by the heater core or by water heater when simultaneously heating the high-voltage battery and the indoor space.

16. The system of claim 1, further comprising a heating heat exchanger at a point where the battery circulation line and the battery heating line are separated from each other, wherein a first coolant of the battery circulation line and a second coolant of the battery heating line exchange heat with each other in the heating heat exchanger, such that the battery circulation line and the battery heating line are connected to each other.

17. The system of claim 16, wherein the controller is further configured to control the first valve and the second valve to circulate the first coolant in the branch line and to control the second coolant to exchange heat while circulating through the heater core, the water heater, and the heating heat exchanger in the battery heating line, such that the second coolant heated by the water heater exchanges heat with the first coolant in the heating heat exchanger before heating the high-voltage battery.

18. The system of claim 16, further comprising a direct circulation line through which coolant can bypass to a point upstream of the water heater at a point downstream of the heating heat exchanger.

* * * * *